(12) United States Patent
Keightley et al.

(10) Patent No.: US 6,947,152 B2
(45) Date of Patent: Sep. 20, 2005

(54) HIGH SPEED LASER MICROMETER

(75) Inventors: John Keightley, Langley (CA); Eric Rechner, Nepean (CA); Adriano Cunha, Delta (CA)

(73) Assignee: 3DM Devices Inc., British Columbia (CA)

( * ) Notice: Subject to any disclaimer, the term of this patent is extended or adjusted under 35 U.S.C. 154(b) by 257 days.

(21) Appl. No.: 10/061,570

(22) Filed: Feb. 1, 2002

(65) Prior Publication Data

US 2002/0105657 A1 Aug. 8, 2002

(30) Foreign Application Priority Data

Feb. 2, 2001 (CA) .............................................. 2334375

(51) Int. Cl.$^7$ .......................... G01B 11/02; G01B 11/04
(52) U.S. Cl. ...................................... 356/638; 356/635
(58) Field of Search ................................ 356/625–629, 356/634–640, 601–613; 364/560–564; 250/550, 222.1, 223 R, 224

(56) References Cited

U.S. PATENT DOCUMENTS

| 4,773,029 | A | * | 9/1988 | Claesson et al. ............. 702/167 |
| 4,905,512 | A | * | 3/1990 | Hayashi ........................ 73/169 |
| 5,469,262 | A | * | 11/1995 | Keen et al. .................. 356/639 |

* cited by examiner

Primary Examiner—Michael P. Stafira
(74) Attorney, Agent, or Firm—Thelen Reid & Priest

(57) ABSTRACT

A large profile, high speed laser micrometer is formed from a light source unit comprised of a plurality of emitter modules that combine to emit a laser sheet and a detector array comprised of a plurality of detector modules. The laser micrometer also includes a data processing unit. Each of the emitter modules is aligned with a corresponding detector module such that an object passing between the light source unit and the detector array can be measured to an accuracy of at least 4/100ths of an inch.

8 Claims, 3 Drawing Sheets

HIGH SPEED LASER MICROMETER

FIELD

The invention relates to a large format, high speed laser micrometer.

BACKGROUND

A laser micrometer provides dimensional information about objects placed in the path of a sheet of laser light which is detected by, or scanned across, a detector. The width of the "shadow" created on the detector provides a dimension of the object.

Existing "laser micrometers" are typically designed for small objects, with a maximum dimension of 6 inches. However, laser micrometers offer accuracy better than $\frac{1}{1000}^{th}$ of an inch, at a scan rate of up to a thousand samples per second. A "sample" refers to a readout of the complete detector array providing one or more measurements of the object(s) within the micrometer.

In a laser micrometer, a laser light sheet is usually formed using either static refractive lens elements or a rotating mirror to scan the beam. The limitation on maximum size is a limitation on the size of these light sheet forming elements.

Alternative systems, known as "light curtains" are usually used in applications such as safety monitoring for preventing access to hazardous or secured areas. However, a laser curtain can be adapted to provide measurements of approximately $\frac{1}{8}^{th}$ of an inch accuracy and resolution. The scan rate from a light curtain is typically 100–200 samples per second.

In a light curtain system, that light sheet is typically a series of independent light beams emitted from a linear array of light emitting diodes (LEDs) spaced at the desired measurement resolution. An array of matching photodiode detectors completes the system. The light curtain design is limited in resolution by the physical spacing between the LEDs. The maximum scan rate is limited by the need to strobe the LEDs in segments to avoid crosstalk arising from adjacent photodiodes "seeing" the wrong LED. The maximum scan rate is also reduced as the size of the light curtain increase due to the large amount of data produced and the limitations of the typical interface and data encoding scheme.

Therefore, there is a need for a large format, high speed laser micrometer that is capable of scanning large objects with a high scan rate and high degree of accuracy.

It is an object of this invention to provide a large format, high speed laser micrometer to scan large objects with a high scan rate and a high degree of accuracy. It is an additional object of this invention to provide a parabolic mirror assembly for forming a collimated laser light sheet.

SUMMARY

A large profile, high speed laser micrometer is formed from a light source unit comprised of a plurality of emitter modules that combine to emit a laser sheet and a detector array comprised of a plurality of detector modules. The laser micrometer also includes a data processing unit. Each of the emitter modules is aligned with a corresponding detector module such that an object passing between the light source unit and the detector array can be measured to an accuracy of at least $\frac{4}{100}$ths of an inch.

Preferably, each of the emitter modules is comprised of two or more laser line generators arranged in an overlapping stair-step fashion to prevent gaps in the laser sheet emitted by the emitter module. Each of the detector modules is comprised of two or more linear CIS detectors, equal to the number of laser line generators, arranged in an overlapping stair-step fashion corresponding to said laser line generators.

Alternatively, the number of data processing units is equal to a fraction of the number of the detector modules such that each data processing unit provides data processing for a number of detector modules located adjacent to one another. Preferably, this fraction is one-third.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION

Figure 1:
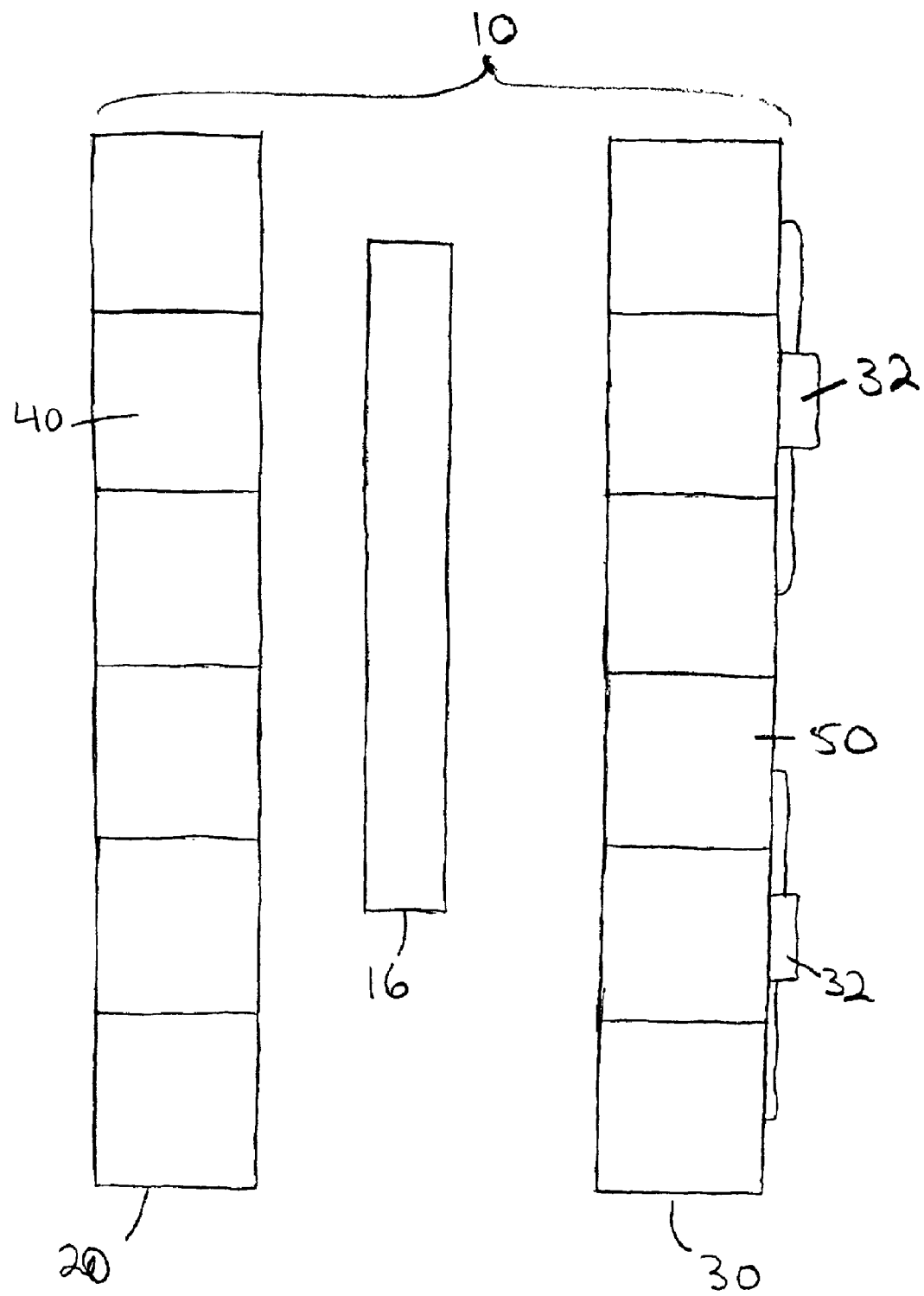
FIG. 1 is a top view of a large format laser micrometer.

The large format laser micrometer 10 shown in FIG. 1 is defined by a light source unit 20 and a detector array 30. The light source unit 20 is connected to a power supply (not shown) for activating and deactivating the light source unit 20. The detector array 30 is connected to a central processing unit (CPU) 34 (not shown) for receiving and interpreting data received from the detector array 30. The CPU 34 may be a dedicated hardware unit provided with a summary display of the micrometer output, a personal computer (PC) or a proprietary system. More generally, any system that interprets and presents the results, preferably while providing control options to the user, will suffice.

Figure 2:
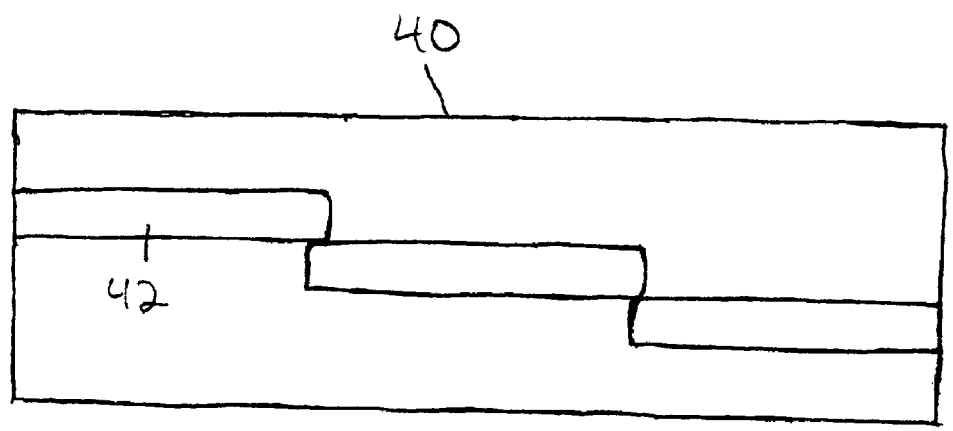
FIG. 2 is a front view of an emitter module.

The light source unit 20 is comprised of a number of emitter modules 40 as shown in FIG. 2. Each emitter module 40 has several laser line generators 42 (three in FIG. 2) along with the associated optics for laser line formation (shown in FIG. 4 and discussed below). The laser line generators 42 are arranged in a stair-step configuration with a slight overlap to eliminate any gaps between the laser line generators. Each laser line generator 42 forms a sheet of light equal in width to the laser line generator 42. The overall result is a laser sheet with an effective width equal to that of the emitter module 40.

Figure 4:
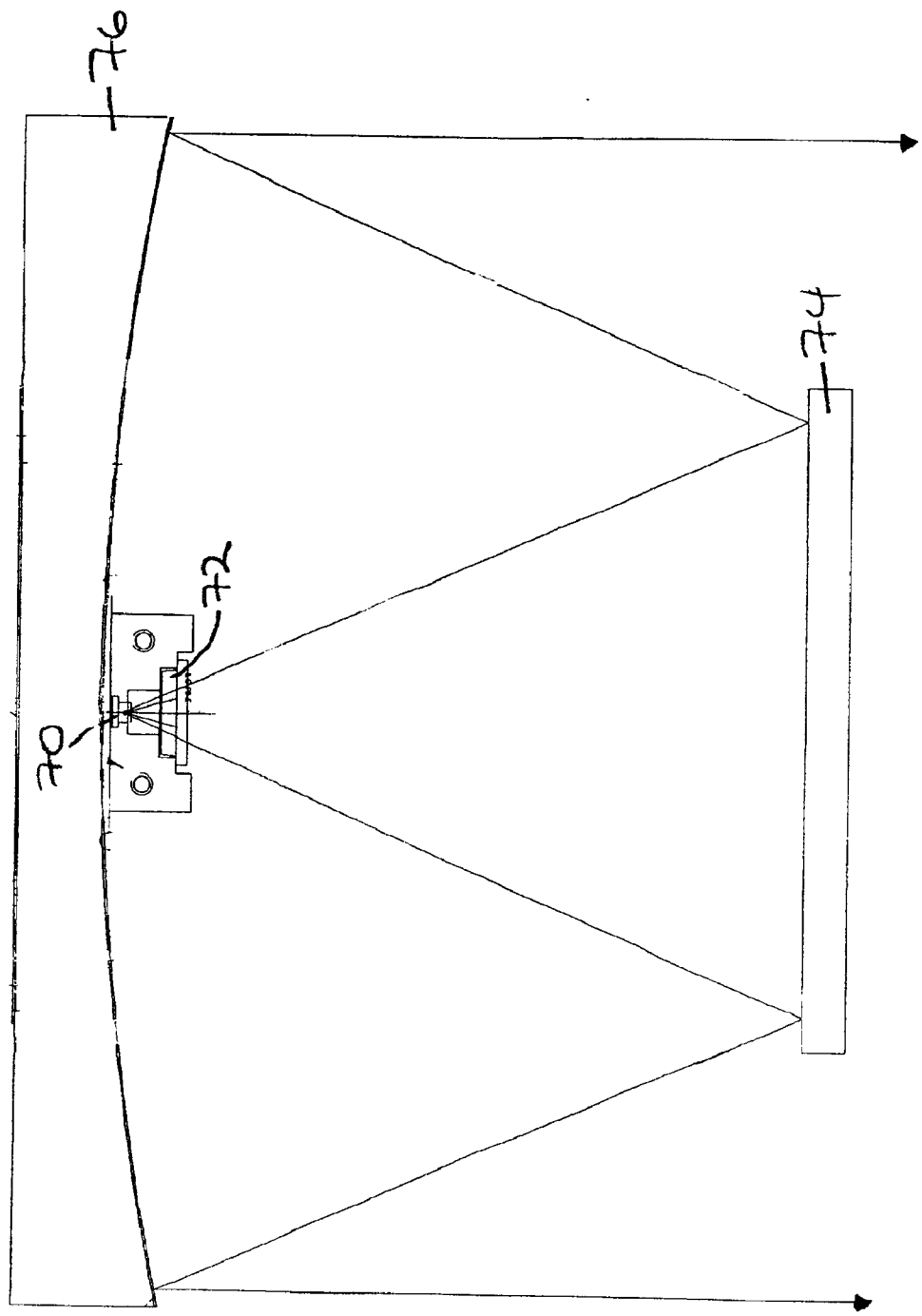
FIG. 4 is a plan view of the laser sheet mirror optics.

The laser optics are shown in more detail in FIG. 4. A laser 70 is passed through an aspherical lens 72 (Kodak Part # LG-11) to collect the light from the laser diode and create a two-dimensional fan-shaped light sheet. This light sheet is reflected off a flat mirror 74 to expand the width of the light sheet without increasing the size required by the optical path. The light sheet is then reflected by parabolic mirror 76 to create a straight, planar light sheet.

In normal operation, each emitter module 40 will be either on (emitting light) or off. However, a pulsed mode of operation should also be provided to allow for alignment and adjustment of the detector array 30 at a lower (less than saturated) signal level.

Figure 3:
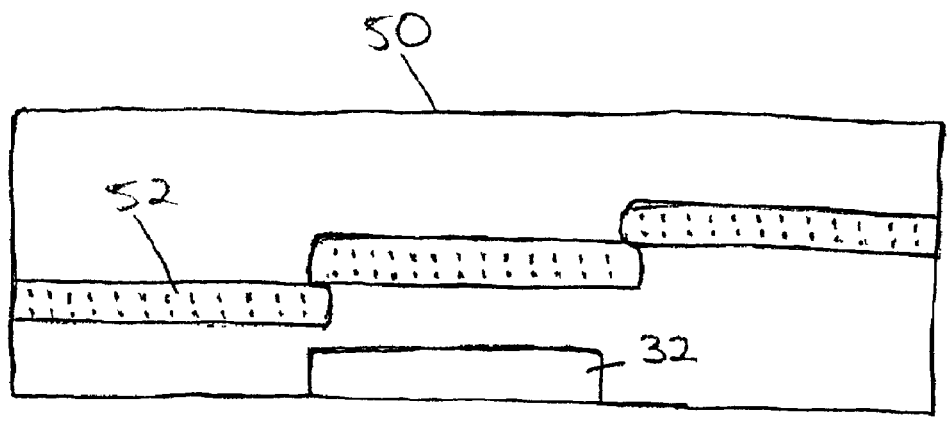
FIG. 3 is a front view of a detector module.

The detector array 30 is comprised of a number of detector modules 50 as shown in FIG. 3. Each detector module 50 is comprised of a number of linear CIS detectors 52 arranged in a stair-step configuration to match the laser line generators 42 in the corresponding emitter module 40. An optical filter covers the CIS detectors to prevent signal interference from ambient or stray light sources.

The detector array 30 also includes one or more data processing units 32. As shown in FIG. 1, one data processing unit 32 is connected to three detector modules 50. The data processing units 32 are used to receive, interpret, and transmit the signals from the detector modules 50 to the CPU 34.

An object 16 passing between the light source unit 20 and the detector array 30 causes an interruption in the path of the laser light incident on the detectors. The resulting transition in the detector is recorded by the data processing unit 32 and passed to the CPU 34 (not shown). The CPU 34 then interprets the transition data and reports it to the user, either in a raw form, or as a calculated measurement of size, whichever is required.

While each detector module 50 may include its own data processing unit 32, it is preferable to have more than one detector module 50 coupled to a data processing unit 32, to reduce cost and system bandwidth requirements. In one configuration, there are two "slave" detector modules coupled to a "master" detector module, one to either side. The "master" detector module houses the data processing unit 32, which receives detector signals from the "master" unit and the two adjoining "slaves".

While more "slaves" can be connected to one "master", there will be a threshold based on the available data bandwidth for transmitting signals. If the number of "slaves" is too large, there will be signal loss at the data processing unit and gaps or errors will result. In a similar vein, while a separate data processing unit 32 could be used for all detector modules 50, the data bandwidth requirements for the CPU 34 make this configuration unsuitable for a detector array 30 with a large number of detector modules 50. The described array using one "master" with two "slaves" represents a balanced approach that should work with the majority of detector array configurations.

The data processing unit 32 is the interface between the detector array 20 and the CPU 34. The data processing unit 32 receives timing signals and commands from the CPU 34 and transmits transition data and gray-scale "video" (if required) back.

During the scanning process, the data processing unit 32 receives an analog pixel data stream from each detector module 50 simultaneously. The analog data is then converted to 8-bit digital data and a threshold comparison is made. The threshold comparison creates a serial bit stream representing ON or OFF pixels. Spurious pixels are removed according to user-defined parameters and the final data is sent to the CPU 34.

Threshold comparison is a digital operation comparing the digitized pixel amplitude to a value defined in the configuration of each detector. The design provides a saturated detector signal when the laser is incident on the detector and a <20% background signal when the laser is interrupted. The optical filter mitigates the effects of ambient lighting on the signal.

The output from the threshold comparison results in a HI or LO logic level clocked for each detector connected to the data processing unit 32 with the same pixel clock. This is encoded as a 24-bit value when there is a transition on any detector. The most significant 12 bits contain the pixel count where the transition occurred, and the next 9 bits report the HI or LO state of each detector pixel at that instant. The least significant 3 bits are used for error control as described below.

With a standard detector at 200 dots per inch (dpi) resolution, the detector resolution is 0.005" per pixel. The practical limit on the resolution is determined by the collimation quality of the laser light sheet and ambient or spurious lighting effects on edge definition. It may be preferable for the data processing unit to ignore every other pixel to reduce the number of spurious transitions and the data bandwidth requirements. The result is an effective resolution of 0.01".

The data processing unit 32 requires some logic to account for conditions that produce a large number of transitions in a single scan line. For example, if a sharp edge of the object being measure is coincident with the longitudinal axis of one of the detectors it would result in a gray edge, a series of pixels rapidly exchanging between ON and OFF states, producing numerous transitions reported from the data processor. This could result in an overload of the data buffers and a consequential loss of data from the scan line and subsequent scan lines.

A second potential problem is excessive or false triggering resulting from interference from dust and other small particulates. Again, the repeated random transitions could overload the data buffers and result in a loss of subsequent data.

The solution is to provide for a user-defined value for transitions below which the transition should be ignored. For example, setting the value to one means that single pixel transitions are ignored i.e. a neighboring pixel must also undergo a transition at the same time for the transition to be recorded and the transition data transmitted.

The data buffer problem must also be considered in the context of available bandwidth both to and from the data processing unit 32. If each detector module 50 has a data processing unit 32, bandwidth to the data processing unit 32 is not a problem, however, bandwidth from the data processing unit 32 (to the CPU 34) becomes a larger factor. The combination of "master" and "slave" detector modules alleviates the situation, however, too many "slaves" and not enough "masters" creates the opposite scenario, in that bandwidth to the data processing unit 32 is now at a premium, and bandwidth from is not a concern.

The limitations on the system, therefore, lie in the bandwidth capabilities of the data processing unit 32 and CPU 34. One "master" and two "slaves" is presented herein as a example that provides efficient data handling capabilities. Obviously, systems with a higher bandwidth can use a larger "slave" to "master" ratio, which will permit a larger array, fewer "masters" to reduce cost, or both.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A large profile, high speed laser micrometer, comprising:
   (a) a light source unit having at least one emitter module that emits a laser sheet, said emitter module having a plurality of laser line generators arranged in overlapping fashion to prevent gaps in the laser sheet;
   (b) a detector array having at least one detector module having a plurality of detectors arranged in overlapping fashion, wherein said emitter module and said detector module are aligned; and (c) at least one data processing unit coupled to said detector array;

such that dimensions of an object passing between said light source unit and said detector array can be measured.

2. The laser micrometer according to claim 1, wherein one or both of said laser line generators and said detectors are arranged in an stair-step fashion.

3. The laser micrometer according to claim 1, wherein said detector module is comprised of linear CIS detectors, the number of said linear CIS detectors equal to the number of laser line generators.

4. A large profile, high speed laser micrometer, comprising:

(a) a light source unit having a plurality of emitter modules that combine to emit a laser sheet, each of said emitter modules having a plurality of laser line generators arranged in an overlapping fashion to prevent gaps in the laser sheet;

(b) a detector array having a plurality of detector modules, each of said detector modules having a plurality of detectors arranged in an overlapping fashion to prevent gaps in the laser sheet, wherein each of said plurality of emitter modules and each of said plurality of detector modules are aligned; and (c) one or more data processing units coupled to said detector array;

such that dimensions of an object passing between said light source unit and said detector array can be measured.

5. The laser micrometer according to claim 4 wherein one or both of said laser line generators and said detectors are arranged in stair-step fashion.

6. The laser micrometer according to claim 4, wherein each of said detector modules is comprised of linear CIS detectors, the number of said linear CIS detectors equal to the number of laser line generators.

7. The laser micrometer according to claim 4, wherein the number of data processing units is equal to a fraction of the number of said detector modules such that each data processing unit provides data processing for a number of detector modules located adjacent to one another.

8. The laser micrometer according to claim 4, where said fraction is one-third.

* * * * *